United States Patent [19]

Bhagwat et al.

[11] Patent Number: 5,425,830
[45] Date of Patent: Jun. 20, 1995

[54] METHOD AND APPARATUS FOR MANUFACTURING PLY STOCK

[75] Inventors: Anand W. Bhagwat, Akron; Kenneth J. Palmer, Wadsworth; Amit Prakash, Hudson, all of Ohio

[73] Assignee: The Goodyear Tire & Rubber Company, Akron, Ohio

[21] Appl. No.: 225,059

[22] Filed: Apr. 8, 1994

Related U.S. Application Data

[62] Division of Ser. No. 29,341, Mar. 8, 1993, Pat. No. 5,337,972.

[51] Int. Cl.⁶ .................. B29C 70/20; B29K 105/08
[52] U.S. Cl. ........................ 156/178; 156/179; 156/324; 156/437; 242/156; 242/156.2
[58] Field of Search ............... 156/177–179, 156/161, 324, 437; 264/175; 242/192.8, 156, 156.2

[56] References Cited

U.S. PATENT DOCUMENTS

| 778,494 | 12/1904 | Kreeger . |
| 801,530 | 10/1905 | Kreeger . |
| 1,321,223 | 11/1919 | Marquette ............... 156/437 X |
| 1,327,826 | 1/1920 | Jameson ................ 156/437 |
| 1,364,259 | 1/1921 | Eaton .................. 242/129.8 |
| 1,488,048 | 3/1924 | Hopkinson ............. 156/179 |
| 2,512,762 | 6/1950 | Benson et al. .......... 156/437 |
| 3,109,605 | 11/1963 | Ostermann . |
| 3,151,819 | 10/1964 | Hodgdon ............... 242/129.8 |
| 3,168,995 | 2/1965 | Ostermann . |
| 3,359,848 | 12/1967 | Ostermann . |
| 3,392,933 | 7/1968 | Singh . |
| 3,720,054 | 3/1973 | Haehnel et al. . |
| 3,907,229 | 9/1975 | Iannucci et al. . |
| 3,921,795 | 11/1975 | Vandale et al. . |
| 4,054,475 | 10/1977 | Botasso et al. . |
| 5,009,732 | 4/1991 | Ikeda et al. . |
| 5,221,409 | 6/1993 | Hart et al. . |

FOREIGN PATENT DOCUMENTS

| 0497098 | 8/1992 | European Pat. Off. . |
| 1511284 | 12/1971 | Germany . |
| 2807111 | 8/1978 | Germany . |
| 4173324 | 6/1992 | Japan . |
| 1194395 | 6/1970 | United Kingdom . |
| WO8302765 | 8/1983 | WIPO . |

Primary Examiner—Jeff H. Aftergut
Attorney, Agent, or Firm—T. P. Lewandowski; Howard M. Cohn

[57] ABSTRACT

A method and apparatus for manufacturing a strip of ply or belt stock reinforced with steel monofilaments fed from a plurality of reels (60, 60', 60") mounted on the spindles (54) of a reel support structure (18). The article of manufacture which results from the method is a uniform strip of reinforced ply or belt stock of higher epi, smaller gauge and fewer splices than possible with prior method and apparatus.

8 Claims, 2 Drawing Sheets

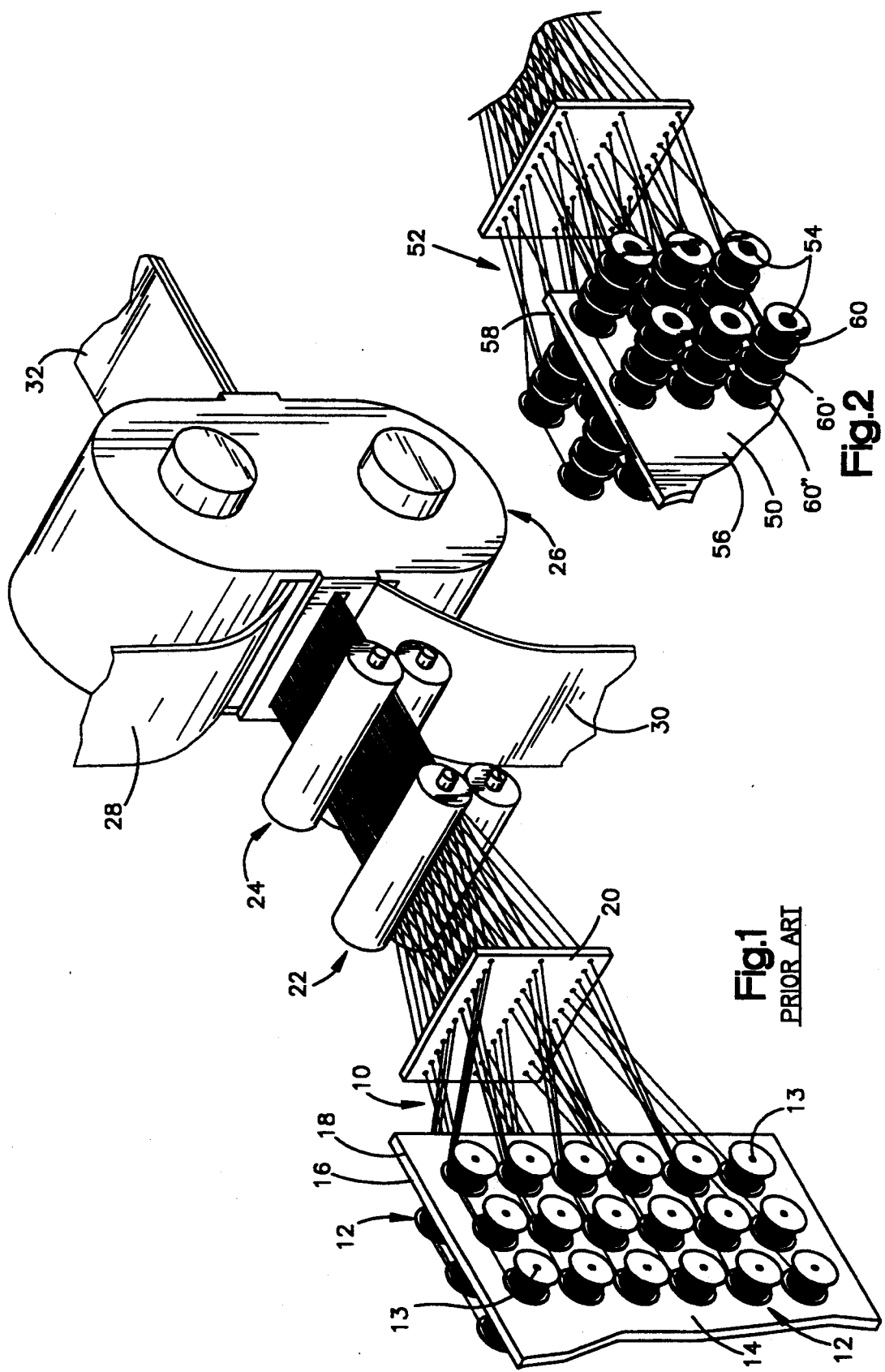

METHOD AND APPARATUS FOR MANUFACTURING PLY STOCK

This is a divisional of application Ser. No. 08/029,341 filed on Mar. 8, 1993, now U.S. Pat. No. 5,337,972.

CROSS REFERENCE TO RELATED APPLICATIONS

This application is related to U.S. application Ser. No. 07/946,698, filed on Sep. 18, 1992 for RADIAL TIRES CONTAINING STEEL MONOFILAMENT IN THE CARCASS PLY.

While the invention is subject to a wide range of applications, it is particularly related to the method and apparatus for manufacturing ply or belt stock. More particularly, the present invention is directed to a method and apparatus for manufacturing ply or belt stock of rubber or elastomeric material used in the production of tires, wherein the ply or belt stock is internally reinforced with more than 30 ends per inch (epi) of metal monofilaments or cords.

Conventionally, radial pneumatic tires for use in passenger car and light truck applications have steel cords embedded in the carcass ply forming the tires. These cords are formed of steel filaments which are woven together and act to increase the strength of the carcass ply. The steel cords are oriented transversely or else obliquely with respect to a major dimension of the ply itself. For reasons of production economy, these plies are obtained by starting with a continuous work piece in which the metal cords constitute a kind of metal warp. This work piece is subsequently reduced, by means of transverse or oblique cuts, into a plurality of segments which are then positioned along-side one another and spliced together along the adjacent edges to form the plies.

Such a method of the prior art is herein explained by referring to FIG. 1. Wire cords 10 are wound about reels 12 which are individually, rotatably supported on spindles 13 that project outward from oppositely facing surfaces 14 and 16 of a reel support structure 18. The cords 10 are paid out toward a guide plate 20. The guide plate 20 is formed with a number of small, equally spaced apertures arranged in three rows spaced from each other. The cords 10 pass through the apertures in each of the rows to be arranged in three planes which intersect at the bite of a first pair of cylindrical guide rollers 22 through which the cords 10 are then introduced. The cords 10 emerge in an horizontal plane and are next introduced through a second pair of cylindrical guide rollers 24 to insure the stable feeding of the cords into an extruder 26. The cords are then covered between two sheets 28 and 30 of rubber or an elastomeric material and pressed in extruder 26 to form a length of reinforced carcass ply 32 used in the production of tires.

Next, as illustrated in FIG. 5, the length of spliceless ply 32 is reduced, by means of a transverse cut, into a plurality of segments 34 which are carried by a conveyor device 36 to a position along-side another segment and then spliced together along the adjacent edges, at station 38, for example as disclosed in U.S Pat. application Ser. No. 07/817,226, assigned to a common assignee with the present invention, and incorporated by reference in its entirety herein. It can be understood that the cords are now arranged in the ply transverse to the direction of travel indicated by the arrow. The resulting strip of spliced ply stock 40 is typically fed into a roll 42.

The prior art system used a single reel mounted on each spindle for each cable in the carcass ply 32. For a typical 48 inch wide ply with 10 ends-per-linear inch (epi) of cord 10, 480 reels on the same number of spindles 13 were required. Assuming that the breaking load for each cord is 100 pounds, there was a breaking load of 1000 pounds per linear inch of ply. To manufacture an equivalent ply with steel strands, each having a breaking load of 30 pounds, instead of cords, 33 epi would be required to maintain the 1000 pounds per inch breaking load. Therefore, three times as many spools would be required to produce a ply reinforced with strands of a given breaking load as compared with the same sized ply of the same breaking load reinforced with cords. Since the reel support structures typically holds about 1400 to 1500 spools for building a car tire and about 800 to 900 spools for building a truck tire, it can be appreciated that the support structures are already very large and occupy large rooms in a manufacturing facility. Therefore, it is impractical to simply increase the size of the support structure 18 to carry the additional reels. To do this, additional space would be required, typically an extremely costly endeavor. Therefore, at present, the most practical solution is to decrease the width of the carcass ply being manufactured by one third. Then, the existing reel support structures could carry enough reels to form a ply of the same breaking load per linear inch as an equivalent sized ply reinforced with cords. The problem with this solution is that since the resulting width of the length of ply is now only 16 inches, two additional splices are required for each 48 inch section of the strip of ply 40. The extra number of splices provides a higher probability of defects and a less uniform final product.

While the prior art is not known to disclose a plurality of spools on a single spindle to feed cable or monofilament for the production of tires, spool supports for multiple spools is known in the textile industry, as illustrated for example in U.S. Pat. No. 3,109,605. This patent discloses adjacent spools rotating in opposite directions during the period that the thread is being drawn off so that a uniform tension is provided on all of the threads. Further, a friction coupling between adjacent spools with a spring mechanism at one end of the spools controls the tension of the thread being drawn off. The problem with this configuration, especially when applied to cords and strands used in the manufacture of tires, is that there can be a slightly different tension on each spool. This difference can be accentuated as the friction couplings wear. Also, when a large number of spools are employed, as in the present invention, it is important that they can be easily and quickly adjusted by an operator to provide a uniform tension.

It is an advantage of the present invention to provide a method and apparatus for manufacturing ply or belt stock that obviates one or more of the limitations and disadvantages of the described prior arrangements.

It is a further advantage of the present invention to provide a method and apparatus for manufacturing ply or belt stock wherein the resulting strip of ply or belt stock has substantially the same strength as a prior art strip of ply stock reinforced with cords but is now reinforced with metal monofilaments or cords having an epi of between two and four times higher than the prior art strip of ply stock.

It is another advantage of the present invention to provide a method and apparatus for manufacturing ply or belt stock wherein the resulting strip of ply or belt has substantially the same strength and size as a prior art strip of ply reinforced with cords but has fewer splices and is more uniform than possible with the prior art method and apparatus of manufacturing a strip of ply.

It is still another advantage of the present invention to provide a method and apparatus for manufacturing ply or belt stock wherein the resulting strip of ply or belt of substantially the same strength and size as a prior art strip of reinforced ply has a reduced thickness or gauge as compared with the reinforced ply constructed with the prior art method and apparatus.

It is a still further advantage of the present invention to provide a method and apparatus for manufacturing ply or belt stock wherein a plurality of reels wound with monofilaments or cords are supported on each spindle of a prior art reel support structure.

It is a yet further advantage of the present invention to provide a method and apparatus for manufacturing ply or belt stock wherein a plurality of reels wound with monofilaments or cords are supported on each spindle of a prior art reel support structure so that adjacent reels rotate in opposite directions and a spring and friction disk arrangement between adjacent reels insures even tension on the monofilaments or cords being drawn off of the reels.

It is also an advantage of the present invention to provide a method and apparatus for manufacturing ply or belt stock wherein all of the reels being supported on a reel support structure can be easily and quickly adjusted so that the monofilaments or cords being drawn off from each of the reels on each of the spindles has a uniform tension.

According to the present invention, a strip of ply or belt stock internally reinforced with more than 30 ends per inch of steel monofilaments or cords for use in a tire can be formed by the method of covering the steel monofilaments or cords with rubber or elastomer. The method comprises the following steps. First, a plurality of the steel monofilaments or cords are fed from a plurality of reels rotatably mounted on each of a plurality of spindles secured at an inner end to a reel support structure. Then, the steel monofilaments or cords are aligned in a predetermined spaced relationship of one to the other. Next, the steel monofilaments or cords are arranged in a horizontal plane and covered with rubber or elastomer. Then the rubber or elastomer covered steel monofilaments or cords are cut to form a length of spliceless reinforced ply or belt stock adapted for use in the production of tires.

In accordance with the invention, the step of feeding a plurality of steel monofilaments or cords includes the step of applying a uniform axial braking force to each of the reels so that a uniform tension is provided on each of the steel monofilaments or cords being fed therefrom. This is accomplished by mounting a first friction disk on each of the spindles to abut against a collar fixed at the inner end of each spindle. Then, the plurality of reels are mounted on each of the spindles whereby a first of the reels abuts against the first friction disk. Next, spring biased friction means are mounted on each of the spindles between each of the reels located adjacent to each other whereby a uniform axial braking force can be applied to each reel. Then, a second friction disk is mounted on each of the spindles adjacent an outer free end of each spindle to abut against a second of the reels located adjacent to the outer free end of the spindle. Continuing, retaining means are mounted at the free end of each spindle to abut against the second friction disk for securing the reels on the spindle and compressing the spring biased friction means whereby the uniform axial braking force is applied independently to each reel so that the monofilaments or cords are fed from each reel with a uniform tension. The step of applying a uniform axial braking force also includes feeding the steel monofilaments or cords from each reel in opposite directions from that of an adjacent reel.

Further in accordance with the invention, the method includes the steps of cutting the length of spliceless ply or belt stock into a plurality of spliceless ply or belt stock segments and moving each cut spliceless ply or belt stock segments to a position along-side a prior cut spliceless ply or belt stock segment. The ply or belt stock segments positioned along-side each other are spliced together to form a length of spliced reinforced ply or belt stock moving in a direction of travel whereby the monofilaments or cords are arranged transverse to the direction of travel of the spliced length of ply or belt stock.

According to the invention, a tire of ply or belt stock internally reinforced with more than 30 ends per inch of steel monofilaments or cords for use in manufacturing a tire is formed by the method of covering the steel monofilaments or cords with rubber or elastomer. The method comprises the following steps. A plurality of steel monofilaments or cords are fed from a plurality of reels rotatably mounted on spindles secured at an inner end to a reel support structure so that at least two of the reels are rotatably mounted on each of the spindles. The steel monofilaments or cords are aligned in a predetermined spaced relationship one to the other. Then the steel monofilaments or cords are arranged in a horizontal plane and covered with rubber or elastomer. Next, the covered steel monofilaments or cords are cut to length to form a spliceless length of reinforced ply or belt stock to produce a tire with a reduced number of splices.

The invention and further developments of the invention are now elucidated by preferred embodiments shown in the drawings.

FIG. 1 is a perspective view of an apparatus of the prior art for manufacturing a length of ply or belt used in the production of tires;

FIG. 2 is a perspective view of a section of a reel support structure with three reels on each spindle in accordance with the present invention;

Figure 3:
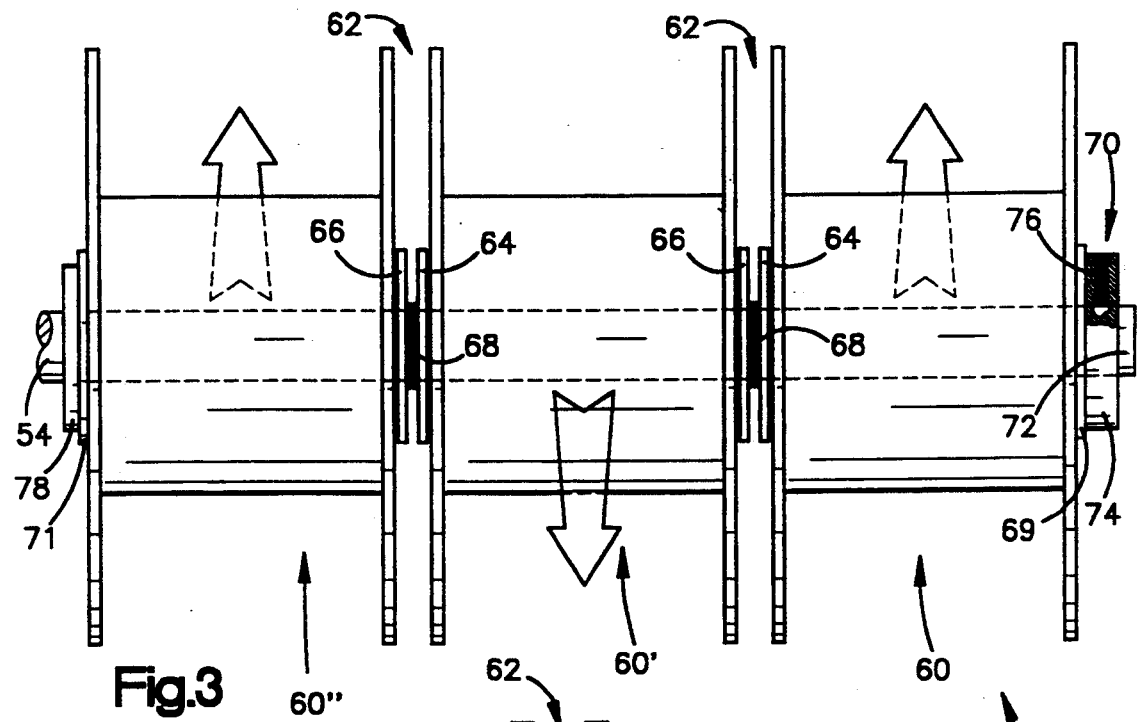
FIG. 3 is a side view of three reels mounted on a single spindle in accordance with the present invention.

As discussed above, FIG. 1 illustrates a prior art system for feeding wire cords 10 from reels 12 which are each rotatably supported on a single spindle 13 projecting outward from oppositely facing surfaces 14 and 16 of a reel support structure 18. The cords 10 are paid out toward a guide plate 20. The guide plate 20 is formed with a number of small apertures arranged in three rows spaced from each other. In each row, the apertures are equally spaced. The cords 10 pass through the apertures in each of the rows so as to be arranged in three planes which intersect at the bite of a pair of cylindrical guide rollers 22 through which the cords 10 are then introduced. The cords 10 emerge in an horizontal plane and are next introduced through a second pair of cylindrical guide rollers 24 to insure the stable feeding of the cords into an extruder 26. The cords are then covered between two sheets 28 and 30 of rubber or an elastomer and pressed in extruder 26 to form a length of reinforced carcass ply or belts 32 used in the production of tires.

Referring to FIGS. 2 and 3, there is shown a section of a novel reel support structure 50 for feeding steel monofilaments or cords 52 during the manufacture of ply or belt stock internally reinforced with more than 30 ends per inch of the steel monofilaments or cords 52. The terms ply stock and belt stock are used interchangeably throughout the specification. A plurality of spindles 54 are secured to the reel support structure 50 so as to project outward from opposing sides 56 and 58. On each of the spindles 54, there are three reels 60, 60', and 60" rotatably mounted with one or more steel monofilaments 52 wound thereabout. As indicated by the arrows, the middle reel 60' rotates in the opposite direction from the other two reels 60 and 60", disposed on either side thereof. While three reels are preferably mounted on each spindle 54, it is within the terms of the invention to mount two or four reels on each of the spindles.

Figure 4:
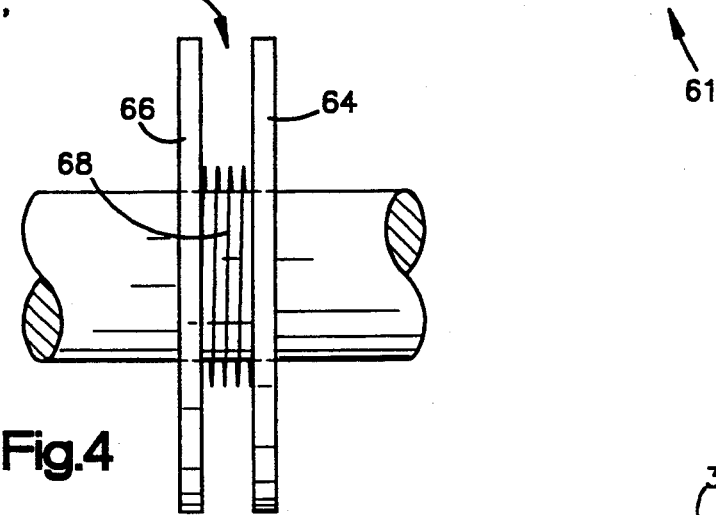
FIG. 4 is a side view of a spring biased friction device disposed between adjacent reels in FIG. 3.

A braking assembly 61 is provided on each spindle to insure that the monofilaments or cords wound about each reel 60, 60', and 60" are fed with a uniform tension. The braking assembly 61 includes a spring biased, friction assembly 62 mounted on each spindle 54, as shown in FIGS. 3 and 4, is located between each pair of adjacent reels for separation thereof. Each of the friction assemblies 62 includes a pair of circular friction disks 64 and 66 which are typically constructed of friction bronze or reinforced friction pads and are rotatably mounted on spindle 54 and separated from each other by a compression spring 68. Each end of the compression spring 68 is preferably secured to the friction disk against which it abuts by means such as brazing. In addition, individual circular friction disks 69 and 71, typically constructed of friction bronze or reinforced friction pads, are rotatably mounted on each spindle 54 and disposed adjacent the outwardly facing sides of the reels 60 and 60", respectively.

The braking assembly 61 also includes a retaining means 70 which is secured at the free end 72 of each spindle 54 and abutted against the friction disk 69 to secure the reels 60, 60', 60" on the spindle to compress the springs 68 so that the friction disks 64 and 66 are in frictional engagement with the side of an adjacent reel and friction disks 69 and 71 are in frictional engagement with the outwardly facing sides of reels 60 and 60", respectively. The retaining means 70 comprises a lock nut 74 which is cylindrical with a hole through the center to enable the nut to mount onto the shaft 54. A threaded hole extending from the outer peripheral surface of the nut 74 to the through hole receives a set screw 76 which is tightened against the spindle 54 to secure the lock nut in place. Preferably, position lines are scribed on each spindle to easily and quickly locate the lock nut at the same location on each of the plurality of spindles. Alternatively, the lock nuts can be positioned flush with the outer end of spindle 54. Retaining means 70 also includes a collar 78 disposed adjacent the inner end thereof which can be integrally constructed with shaft 54. The friction disk 71 is mounted between collar 78 and the side wall of reel 60".

To assemble the reel assembly, the friction disk 71 is first mounted onto the spindle to abut against the collar 78. Then reels 60, 60' and 60" are mounted on the spindle 54 with friction assemblies 62 interposed therebetween. Next, friction disk 69 is mounted onto the spindle to abut against the reel 60. Finally, lock nut 74 is slid onto the shaft 54, and pressed against friction disk 69 to move the reels towards the first end of the spindle and compress the spring biased friction assemblies 62. The lock nut is secured at a desired position by tightening the set screw 76 against the spindle. The resulting braking force is created by the compression of springs 68 which generates an axial force that presses the brake disks against the opposite sides of the reels. A feature of the invention is that the axial force is independently and equally applied to each of the reels 60, 60', 60". To further insure that the braking force is applied independently and evenly, the middle reel 60' rotates in the opposite direction from the outer reels 60 and 60". The unique braking assembly, as disclosed, insures that the rotation of each reel is unaffected by the rotation of other reels on the same spindle whereby the wire is fed from each of the reels with a uniform tension. Moreover, since the lock nut can be easily and quickly secured in the same location on each spindle, the wire is fed from each reel on the reel support structure 18 with a uniform tension.

Figure 5:
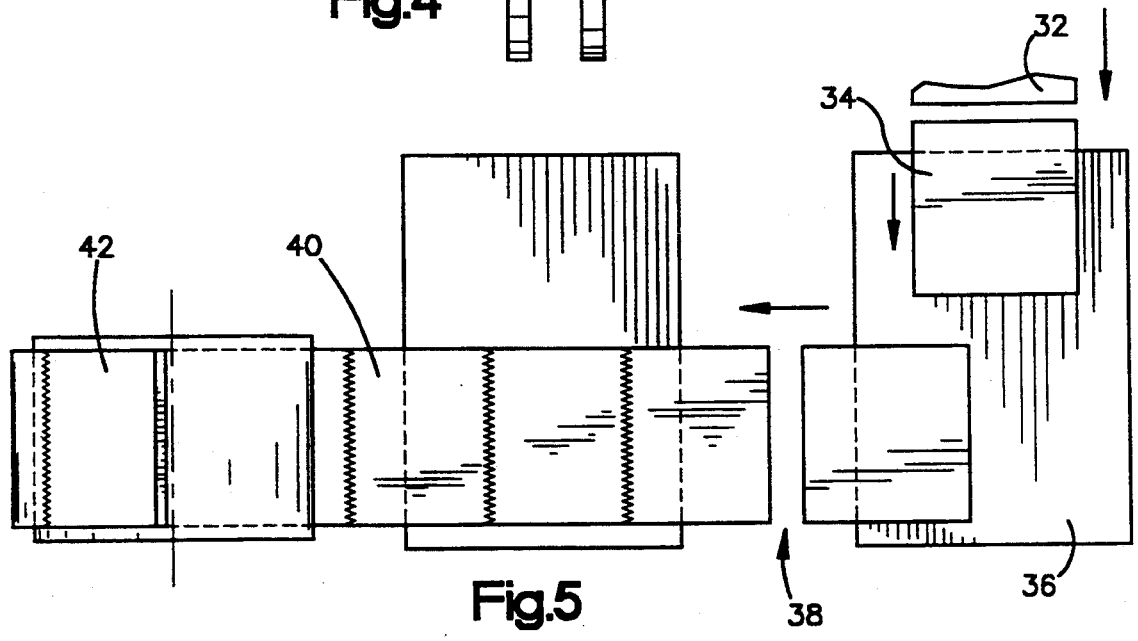
FIG. 5 is a schematic illustration of the movement, cutting, splicing, and rolling of the ply or belt stock subsequent to being fed out of an apparatus of the type illustrated in FIG. 1.

In operation, the reel support structure 18 feeds a plurality of steel monofilaments or cords 52, at a uniform tension, through guide plate 20 to align the steel monofilaments or cords in a predetermined spaced relationship one to the other. Then, the aligned monofilaments or cords are arranged in a horizontal plane by passing them through at least one pair of cylindrical guide rollers 22. It is preferred to pass the monofilaments or cords arranged in a horizontal plane through a second pair of cylindrical guide rollers 24 to insure that the monofilaments or cords maintain the desired location and spacing between each other. Next, the aligned steel monofilaments or cords are covered by rubber or elastomer 28 and 30 and pressed in extruder 26 to form a length of spliceless reinforced ply stock 32 adapted for use in the production of tires. Next, as illustrated in FIG. 5, the spliceless length of ply is cut into a plurality of ply segments 34 which are each moved to a position along-side a prior cut one of the spliceless ply segments. Finally, the two segments are spliced together alongside each other to form a length of spliced reinforced ply stock 40 moving in a direction of travel with the steel monofilaments or cords arranged transverse at any desired angle to the direction of travel of the second length of ply stock. While the monofilaments or cords can be perpendicular to the direction of travel of ply stock, it is within the terms of the invention that the monofilaments or cords be arranged at any desired angle with respect to the direction of travel. The resulting strip of spliced ply stock 40 is typically fed onto a roll 42.

The article of manufacture which results from the method of production, as just described, is a length of spliced ply stock 40 of the same width and substantially the same breaking force as a length of ply reinforced with steel cords manufactured using the prior art apparatus with only a single reel mounted on each spindle of the reel support structure. However, the improve length of spliced ply stock 40 constructed by the invention disclosed herein is reinforced with steel monofilaments or cords having an epi which can be between two and four times greater, and preferably three times greater, than the epi of steel cords used to reinforce the prior art length of ply. The new method of production, as described herein, uses the same system as that used to manufacture the prior art ply reinforced with steel cords except that each of the spindles 54 on the reel support structure 18 is now provided with three reels instead of one reel. Further, a braking assembly is provided which insures that the monofilaments or cords are fed off the reels with a uniform tension. The length of spliced ply cord manufactured by the improved method, as disclosed herein, has several advantages over the length of ply constructed by the prior art method. First, the steel monofilaments or cords used in the improved apparatus are of a smaller diameter than the prior art steel reinforcement cords and therefore the thickness or gauge of the resulting ply stock is less. This means that less rubber or elastomeric material is required and a significant cost savings can be achieved. A second advantage is that the number of splices in a length of spliced ply stock 40 reinforced with steel monofilaments or cords, as disclosed, is less, e.g. one third less, than the number of splices in a length of prior art ply stock reinforced with steel cords. The fewer number of splices reduces the probability of defects and results in a more uniform final product.

It is apparent that there has been provided in accordance with this invention a method for manufacturing a strip of ply stock reinforced with steel monofilaments or cords for use in a tire on a prior art apparatus modified to have a plurality of reels mounted on each spindle of a reel support structure. The article of manufacture, resulting from the method of production and improved apparatus, e.g., a uniform strip of reinforced, spliced ply stock having a higher epi and fewer splices than possible with the prior method and apparatus, satisfies the objects, means and advantages set forth hereinbefore.

While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed is:

1. A method of covering steel monofilaments or cords with rubber or elastomer for the manufacture of a strip of ply or belt stock reinforced with steel monofilaments or cords adapted for use in a tire, comprising the steps of:
   a. feeding a plurality of said steel monofilaments or cords with a uniform axial braking force from a plurality of reels rotatably mounted on spindles secured at an inner end to a reel support structure so that two or more of said plurality of reels are rotatably mounted on each of said spindles with friction means and spring biasing means disposed between each of said two or more of such plurality of reels whereby said spring biasing means presses said friction means against said two or more of said plurality of reels;
   b. aligning said steel monofilaments or cords in a predetermined spaced relationship one to another;
   c. arranging said steel monofilaments or cords in a horizontal plane;
   d. covering said steel monofilaments or cords in a horizontal plane with rubber or elastomer; and
   e. pressing said covered steel monofilaments or cords to form a length of reinforced spliceless ply or belt stock adapted for use in production of tires.

2. The method as defined in claim 1 wherein said step of feeding a plurality of said steel monofilaments or cords with a uniform axial braking force to each of said two or more of said plurality of reels provides a uniform tension on all of said steel monofilaments or cords being fed from said two or more of said plurality of reels on each of said spindles.

3. The method as defined in claim 1 wherein said step of applying a uniform axial braking force to each of said two or more of said plurality of reels includes the steps of:
   mounting a first friction disk on each of said spindles to abut against a collar fixed at said inner end of each of said spindles;
   mounting said two or more of said plurality of reels on each of said spindles whereby a first of said two or more of said plurality of reels abuts against said first friction disk;
   mounting a second friction disk on each of said spindles adjacent an outer free end of each of said spindles, said second friction disk being abutted against a second of said two or more of said plurality of reels located adjacent said outer free end of each of said spindles; and
   mounting retaining means at said free end of each of said spindles to abut against said second friction disk for securing said two or more reels on each of said spindles and compressing said spring biasing means whereby said uniform axial braking force is applied independently to each of said two or more of said plurality of reels and said steel monofilaments or cords fed from each of said two or more of said plurality of reels on each of said spindles with a uniform tension.

4. The method as defined in claim 3 further including a third reel mounted on said spindle between said two or more of said plurality of reels.

5. The method as defined in claim 4 wherein said step of applying a uniform axial braking force to each of said reels includes the step of feeding said steel monofilaments or cords from each of said two or more of said plurality of reels mounted on each of said spindles in opposite directions from that of an adjacent reel.

6. The method as defined in claim 5 further including the steps of:
   cutting said length of spliceless ply or belt stock into a plurality of spliceless ply or belt stock segments;
   moving a cut one of said cut spliceless ply or belt stock segments to a position along-side a prior cut one of said spliceless ply or belt stock segments; and
   splicing together said spliceless ply or belt stock segments positioned along-side each other to form a length of reinforced spliced ply or belt stock moving in a direction of travel whereby said monofilaments or cords are arranged transverse to the direction of travel of said length of spliced ply or belt stock.

7. The method as defined in claim 6 wherein said step of aligning said steel monofilaments or cords in a predetermined spaced relationship one to the other includes the step of passing said steel monofilaments or cords fed from said two or more of said plurality of reels on each of said spindles through a guide plate.

8. The method as defined in claim 7 wherein said step of arranging said plurality of steel monofilaments or cords in a horizontal plane includes the step of passing said steel monofilaments or cords, subsequent to said step of aligning, through a pair of cylindrical guide rollers.

* * * * *